US012185151B2

(12) United States Patent
Ji et al.

(10) Patent No.: US 12,185,151 B2
(45) Date of Patent: Dec. 31, 2024

(54) CONFIGURATIONS FOR AVAILABILITY OF INTERFACES USED IN V2X COMMUNICATIONS

(71) Applicant: Nokia Technologies Oy, Espoo (FI)

(72) Inventors: Lianghai Ji, Aalborg (DK); Ling Yu, Kauniainen (FI); Vinh Van Phan, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 423 days.

(21) Appl. No.: 17/634,008

(22) PCT Filed: Aug. 5, 2020

(86) PCT No.: PCT/FI2020/050516
§ 371 (c)(1),
(2) Date: Feb. 9, 2022

(87) PCT Pub. No.: WO2021/028616
PCT Pub. Date: Feb. 18, 2021

(65) Prior Publication Data
US 2022/0295330 A1    Sep. 15, 2022

Related U.S. Application Data

(60) Provisional application No. 62/885,868, filed on Aug. 13, 2019.

(51) Int. Cl.
H04W 28/02    (2009.01)
H04L 67/61    (2022.01)
(Continued)

(52) U.S. Cl.
CPC ......... H04W 28/0205 (2013.01); H04L 67/61 (2022.05); H04W 4/40 (2018.02);
(Continued)

(58) Field of Classification Search
CPC ............... H04W 28/0205; H04W 4/40; H04W 28/0268; H04W 74/0833; H04W 40/02;
(Continued)

(56) References Cited

U.S. PATENT DOCUMENTS

2018/0139593 A1* 5/2018 Chun ................. H04W 4/46
2019/0045405 A1* 2/2019 Byun .................. H04W 48/18
(Continued)

FOREIGN PATENT DOCUMENTS

EP    3223575 A1    9/2017
EP    3448071 A1    2/2019
EP    3518498 A1    7/2019

OTHER PUBLICATIONS

"The enhancement of Uu to control inter-RAT V2X sidelink", 3GPP TSG-RAN WG2 Meeting#106, R2-1907421, Agenda: 11.4.7, Huawei, May 13-17, 2019, pp. 1-3.
(Continued)

Primary Examiner — Kwang B Yao
Assistant Examiner — Bradley D Lytle, Jr.
(74) Attorney, Agent, or Firm — Robert P. Michal, Esq.; Carter, DeLuca & Farrell LLP

(57) ABSTRACT

Example embodiments of the invention provide at least a method and apparatus for performing identifying, by a network node of a communication network, a configuration of interface availability for performing at least one of v2x service and/or proximity services by each of at least one network device; and communicating with the at least one network device information comprising the configuration based on the interface availability for use in performing the at least one of v2x service and/or proximity services. Further, for performing receiving, by a network device of a communication network, information comprising a configuration of interface availability for performing at least one of
(Continued)

v2x service and/or proximity services by the network device; and determining, based on the received configuration, the interface availability for performing the at least one of v2x service and/or proximity services.

1 Claim, 3 Drawing Sheets

(51) Int. Cl.
*H04W 4/40* (2018.01)
*H04W 4/46* (2018.01)
*H04W 40/02* (2009.01)
*H04W 40/24* (2009.01)
*H04W 74/0833* (2024.01)
*H04W 76/14* (2018.01)

(52) U.S. Cl.
CPC ......... *H04W 4/46* (2018.02); *H04W 28/0268* (2013.01); *H04W 40/02* (2013.01); *H04W 40/24* (2013.01); *H04W 74/0833* (2013.01); *H04W 76/14* (2018.02)

(58) Field of Classification Search
CPC ....... H04W 40/24; H04W 76/14; H04W 4/46; H04L 67/61
See application file for complete search history.

(56) References Cited

U.S. PATENT DOCUMENTS

| 2019/0090173 | A1* | 3/2019 | Xiao | H04W 4/40 |
| 2019/0132251 | A1* | 5/2019 | Dao | H04L 69/22 |
| 2021/0329487 | A1* | 10/2021 | Wang | H04W 28/24 |

OTHER PUBLICATIONS

International Search Report and Written Opinion received for corresponding Patent Cooperation Treaty Application No. PCT/FI2020/050516, dated Oct. 28, 2020, 15 pages.
"Report of email discussion [104#57] [NR/V2X] Interface selection", 3GPP TSG-RAN WG2 Meeting #105, R2-1901705, Agenda: 11.4.4, Ericsson, Feb. 25-Mar. 1, 2019, 35 pages.
"3rd Generation Partnership Project; Technical Specification Group Radio Access Network; NR; Study on NR Vehicle-to-Everything (V2X) (Release 16)", 3GPP TR 38.885, V16.0.0, Mar. 2019, pp. 1-122.

* cited by examiner

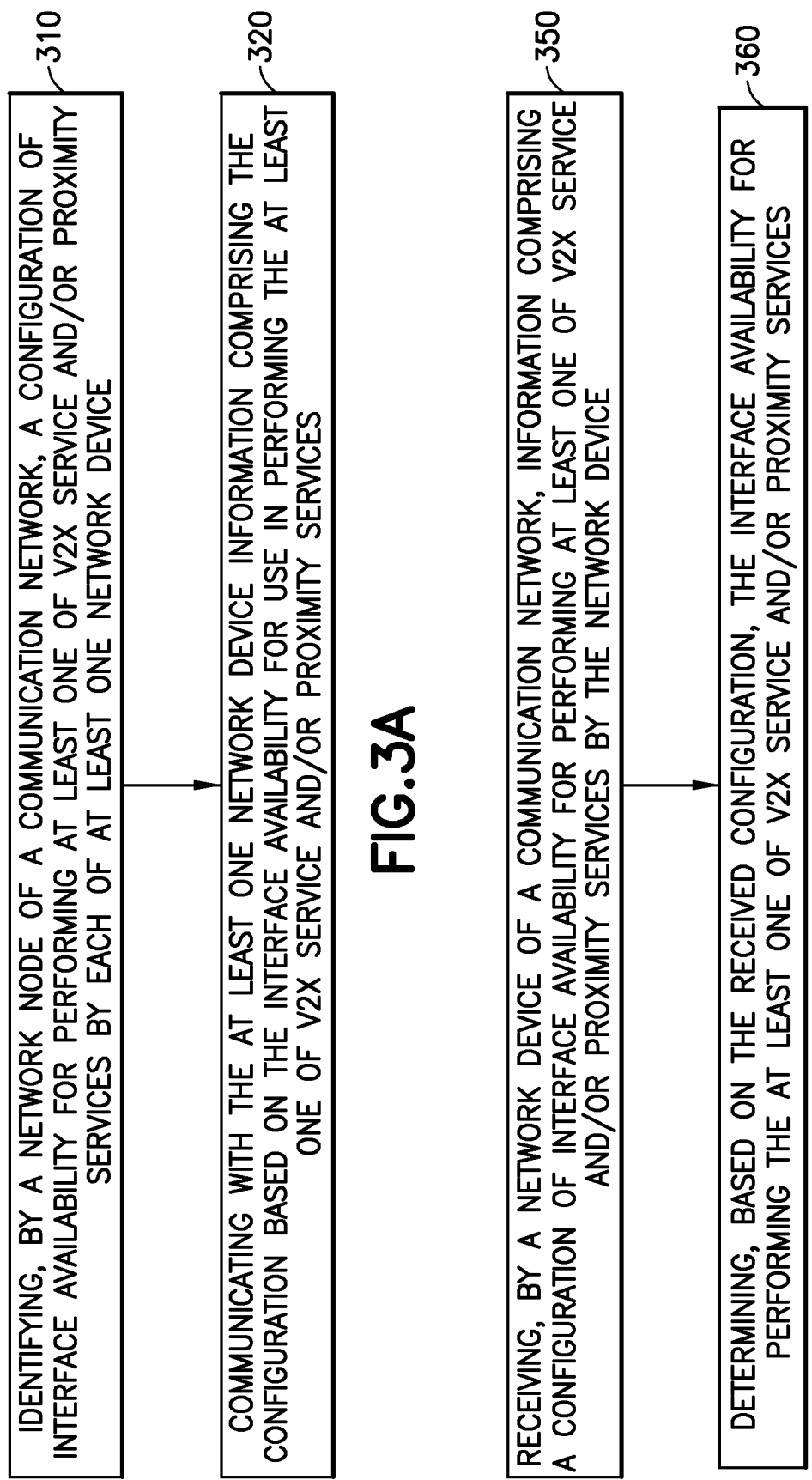

CONFIGURATIONS FOR AVAILABILITY OF INTERFACES USED IN V2X COMMUNICATIONS

RELATED APPLICATION

This application was originally filed as PCT Application No. PCT/FI2020/050516, filed on 5 Aug. 2020, which claims priority from U.S. Provisional Application No. 62/885,868, filed on 13 Aug. 2019, each of which is incorporated by reference herewith in its entirety.

TECHNICAL FIELD

The teachings in accordance with the exemplary embodiments of this invention relate generally to operations for determining Uu/PC5 availability information configurations and, more specifically, relate to configurations for determining and communicating the configuration for the Uu/PC5 availability information with particular network devices for use in improved V2X and proximity services such as but not limited to D2D communications by these particular network devices.

BACKGROUND

Certain communication systems enable V2X and D2D communications to be performed. V2X communications can be based on communication technologies such as "sidelink" communication technologies. For this, sidelink resource pools and sidelink channels can be established for vehicles participating in such communications. In addition, such sidelink communication technologies for V2X communications can be referred as Device-to-Device (D2D) communication technology and used for example Proximity-based Services (ProSe) communication.

Further, in V2X communications a network device located in a vehicle may perform the V2X communications using a resource allocated by a base station or a resource autonomously selected within a resource pool configured by the base station when sidelink/D2D communication technologies are applied. The base station may also adjust V2X communication parameters such as to try to achieve a maximum transmission power and/or range based on channel congestion.

Further, in V2X communications a network device located in a vehicle may perform the V2X communications using the radio interface (e.g. Uu interface in LTE or 5G cellular network) with a base station to communicate with another V2X communication network device or V2X service application server through a wireless network.

Example embodiments of the invention work to implement improved operations associated with at least these operations as described above.

Certain abbreviations that may be found in the description and/or in the Figures are herewith defined as follows:
5QI 5G QoS indicator
APP application
AS access stratum
BS base station\
CBR channel busy ratio
E2E end-to-end
LCH logical channel
NW network
PFI PC5-flow indicator
PQI PC5-QoS indicator
PDN packet data network
QFI QoS-flow ID
QoS quality of service
RA random access
RAT radio access technology
SIB system information block
SL sidelink
UE user equipment
UP user-plane
V2X vehicle-to-everything

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 3A and FIG. 3B each show a method which may be practiced by an apparatus in accordance with an example embodiment of the invention.

DETAILED DESCRIPTION

Figure 1:
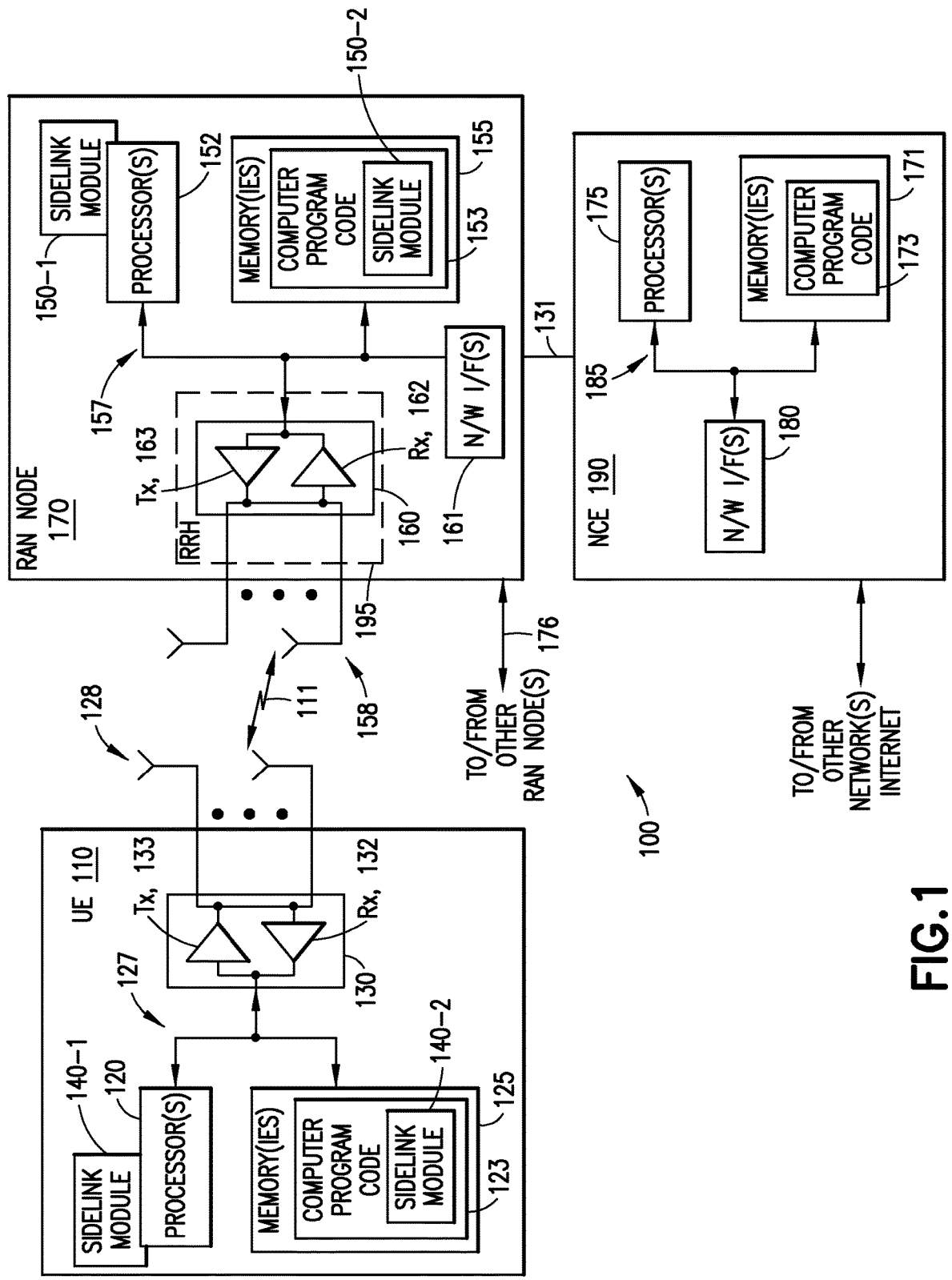
FIG. 1 illustrates a simplified block diagram of exemplary electronic devices that are suitable for use in practicing various exemplary embodiments of this invention.

In example embodiments of the invention there is proposed at least a method of configurations for Uu/PC5 availability information with particular network devices for use in improved V2X and proximity services such as but not limited to D2D communications by each of particular network devices.

At the time of this application there has been in 3GPP Release 16, work items for 5G vehicle-to-everything (V2X) communications.

In this regard, interface selection is one of the topics to be addressed. To be more specific, upper layers or a protocol layer above the access stratum at a network device such as a user equipment (UE) or a V2X user equipment (UE) can select and switch the air interface between the Uu interface and the PC5 interface for a V2X service.

In these work items it may be assumed that the candidate RAT(s) for SL transmission over PC5 interface are associated with one or multiple service type(s) by upper layers. For example, a given V2X service type may be associated with:
1) LTE RAT only,
2) NR RAT only, or
3) LTE or NR RAT, or
4) LTE and NR RAT.

RAT selection is performed by upper layers using a Tx profile that defines sidelink transmission format including e.g. the supported features in different 3GPP releases for different RAT. For instance, Tx profile associated with an option 1) LTE RAT only or an option 4) LTE and NR RAT may be selected for a V2X service that requires V2X SL broadcast transmission. Further, Tx profile associated with 2) NR RAT only may be selected for a V2X service that requires V2X SL unicast and groupcast transmissions.

In these operations the access stratum (AS) layer at a V2X UE checks the availability of the different radio interfaces, Uu and PC5. Following that, the AS layer reports the availability information of the different interfaces to the UE upper layers, i.e. above AS layer. The selection of the radio interface is performed at the UE upper layers, based on the received availability information from the AS layer.

Moreover, as specified at the time of this application in 3GPP, a UE can be configured to use both NR SL mode 1 and NR SL mode 2. In NR SL mode 1, the SL transmission resource will be scheduled by the base station, while the V2X UE in NR SL mode 2 autonomously selects the transmission resource from a resource pool. In addition, the AS layer at a V2X UE considers the UE in-coverage/out-of-coverage as the baseline to determine the Uu interface availability/unavailability. In this case, the following can happen:

At the UE side:
1. The AS layer at an in-coverage UE can report the availability information of Uu and PC5 to the upper layers;
2. The upper layers may select either Uu or sidelink (SL) for packet transmission if either interface can be selected for a targeted V2X service;
3. If Uu is selected or SL mode 1 is selected, the UE may perform the random access (RA) procedure and request for RRC connection setup if it is in RRC_Idle or RRC_Inactive state; and
4. The UE requests for the time-and-frequency resource for Uu or SL mode 1 transmission.

At the network side:
5. Network performs the admission control, based on the received RRC connection request message, e.g., such as in Step 3 above. At this stage, network may reject the RRC connection request, if there is a heavy traffic load already on Uu/PC5; and
6. Once the V2X UE has established the RRC connection, it may request for the resource for the transmission via Uu and/or SL using SL mode 1 resource allocation. Thus, once a scheduling request (SR) or a buffer status report arrives at the gNB, the gNB performs the resource allocation. Based on the traffic load on Uu/PC5, network may reject the resource allocation request, if it does not have enough resource to support the transmission via the UE-selected interface.

Here, the rejection decision from network either during RRC connection setup procedure or during Uu/SL resource request procedure will introduce additional signaling overhead and latency for the communication, provided that selection of another interface (e.g., PC5 interface) or using different SL resource allocation mode (e.g., mode 2) can also serve the targeted V2X service Further, at the time of this application 3GPP has defined to use the UE in-coverage/out-of-coverage status as the baseline to determine the Uu interface availability/unavailability for V2X communication. Moreover, a V2X UE can be configured for transmission via SL mode 1 and/or SL mode 2. One 3GPP proposal is for a UE to judge the cell capabilities of V2X sidelink communication using the presence of LTE/NR V2X associated system information blocks (SIBs). However, only cell capability of supporting either LTE V2X or NR V2X or both was discussed in the TDoC, and the proposals disclose little detail on how a UE determines Uu or PC5 availability.

Example embodiments of this invention include at least a method and apparatus to perform RAT and interface selection based on the configured Uu and PC5 interface availability.

Before discussing example embodiments of the invention in further detail, reference is made to FIG. 1 which illustrates a simplified block diagram of exemplary electronic devices that are suitable for use in practicing various exemplary embodiments of this invention. Turning to FIG. 1, this figure shows a block diagram of one possible and non-limiting exemplary system in which the exemplary embodiments may be practiced.

In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module, comprising one of or both parts 140-1 and/or 140-2, which may be implemented in a number of ways. The UE 110 includes processing components including a sidelink module(s) 140-1 and 140-2. These sidelink modules can include processor configurations that can be implemented to perform example embodiments of the invention as disclosed herein. The sidelink module may be implemented in hardware as sidelink module 140-1, such as being implemented as part of the one or more processors 120. The sidelink module 140-1 may be implemented also as an integrated circuit or through other hardware such as a programmable gate array. In another example, the sidelink module may be implemented as sidelink module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with radio access network (RAN) node 170 via a wireless link 111.

The RAN node 170 may be a base station that provides access by wireless devices such as the UE 110 to the wireless network 100. For example, the RAN node 170 may be a node (e.g. a base station) in a NR/5G network such as a gNB (a node that provides NR user plane and control protocol terminations towards the UE 110) or an ng-eNB (a node providing E-UTRA user plane and control plane protocol terminations towards the UE 110, and connected via an NG interface to the core network (i.e. 5G Core (5GC)). The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The RAN node 170 includes a sidelink module, comprising one of or both parts 150-1 and/or 150-2, which may be implemented in a number of ways. The sidelink module may be implemented in hardware as sidelink module 150-1, such as being implemented as part of the one or more processors 152. The sidelink module 150-1 may be implemented also as an integrated circuit or through other hardware such as a programmable gate array. In another example, the sidelink module may be implemented as sidelink module 150-2, which is implemented as computer program code 153 and is executed by the one or more processors 152. For instance, the one or more memories 155 and the computer program code 153 are configured, with the one or more processors 152, to cause the RAN node 170 to perform one or more of the operations as described herein. The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the RAN node 170 being physically in a different location from the RRH, and the one or more buses 157 could be implemented in part as fiber optic cable to connect the other elements of the RAN node 170 to the RRH 195.

The wireless network 100 may include a network control element or elements NCE 190 that may include core network functionality, and which provides connectivity via a link or links with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the NCE 190, and note that both 5G and LTE functions might be supported. The RAN node 170 is coupled via a link 131 to a network control element such as the NCE 190. The link 131 may be implemented as, e.g., an NG interface for 5G, or an S1 interface for LTE, or other suitable interface for other standards. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

In accordance with example embodiments of the invention there is proposed a signaling mechanism of configuring Uu/PC5 interface availability to facilitate UEs to determine the availability of the Uu/PC5 for their V2X services.

An example embodiment of the invention includes:

1. The Uu interface availability is configured to the UE with either the default availability information or the detailed availability information or both using either broadcasted signaling (e.g. SIB) or dedicated signaling (e.g. dedicated RRC signaling). Herein the default Uu availability information (e.g. based on in-coverage/out-of-coverage condition) can be applied to all the V2X services if no detailed availability information is configured. The detailed availability information may be applied only to the V2X services with the configured Quality of Service (QoS) profiles as proposed below:

a. In case of broadcasted signaling, the Uu interface availability may be indicated for different QoS profile (e.g. in the form of 5QI/PQI, QFI/PFI). For instance, Uu interface availability indication may be defined as QoS profile list or threshold, i.e., Uu interface is available only for those V2X services with listed 5QI/PQI or with 5QI/PQI above the configured threshold. The threshold may be defined as the value of 5QI/PQI or with one or more parameters associated with 5QI/PQI. The configured QoS profile for Uu interface availability may be also associated with SL resource pool configuration. For instance, multiple QoS profile lists/thresholds for Uu interface availability may be configured and each QoS profile list/threshold is associated with a corresponding CBR level of the SL resource pool(s);

b. In case of dedicated signaling, the Uu interface availability may be indicated either for different QoS profile as proposed above, or for different logical channels or logical channel groups; and c. In both options, the detailed Uu interface availability information configuration may also indicate the valid time of the availability information (e.g., for short term such as at the level of milliseconds/seconds or for longer term at the level of minutes). This may be used for UE to expect the modified SIB or update of the dedicated signaling. This can also be used for UE to determine whether the detailed Uu availability information should be provided to the upper layer or not as proposed below.

2. The above proposed signaling mechanism for Uu interface availability in accordance with example embodiments of the invention may be also extended to configure the UE to determine whether SL mode 1 or mode 2 resource allocation scheme should be used. For instance, when PC5 interface is selected by upper layer and UE is configured to use at least one of the SL mode 1 or mode 2 resource allocation for one or multiple V2X service(s), the QoS profile list/thresholds may be configured to allow the UE to determine which SL resource allocation mode should be used for the targeted V2X services or data flows;

3. Based on the NW configuration on interface/mode availability for V2X services with different QoS profiles as well as the valid time of such information, the AS layer of UE may:

either report the detailed availability information of the different interfaces to its upper layers based on the network configuration, e.g., when the valid time of the detailed availability information is for longer term, or report to its upper layers for interface/mode-selection based on only the default availability configuration, if the detailed availability information is configured for short term. In this case, the AS layer of UE may reject the interface selection decision from the upper layers based on the detailed availability information without requesting from the network for connection setup or resource allocation for the communication over the selected interface. In this option, the proposed signalling mechanism of detailed availability information can be kept in AS layer without extensive interface availability information exchange between AS layer and upper layers; and 4. The above proposed Uu availability and PC5 mode selection configuration information may be transmitted to the neighbor cells, e.g., during handover or for inter-cell coordination. For instance, based on this information, the UE during a handover procedure can prepare itself before moving into the target cell, e.g., proactively switch to another interface when it is still served by the source cell.

Further, example embodiments of the invention may provide for a network node, such as a base station, to determine Uu/PC5 availability information configurations and sends to UEs so that UEs can select Uu interface or PC5 interface for its each service based on the configurations set by the base station. The availability information configuration may include:

explicit indication of the availability of each interface for different QoS profiles; or the rules or conditions for UE to determine the availability of different interfaces, e.g. which QoS profile considers the Uu and/or SL interface available/unavailable under what Uu and SL conditions with what kind of time scale, or the condition includes thresholds used for selecting Uu interface or PC5 interface, and only those V2X services or the V2X data flows fulfilling the rules or conditions set by network can select the Uu interface or PC5 interface; or how UE utilizes the determined availability information between AS and upper layer.

Different level of availability information configurations are proposed: default availability information and/or detailed availability information can include:

The default availability information can be interpreted as a special threshold detection, e.g., based on whether the UE is under network coverage or out of network coverage;

The proposed detailed availability information could be related with different threshold values for different conditions, or it could be explicitly indicated for different QoS profiles, or it could be even indicated by using certain rules/functions; and/or Based on the different level configuration, the corresponding UE behaviour is also different. For example:

UE may only report to the upper layer Uu and SL availability information based on default availability configuration and AS layer in the UE will determine whether the selected interface from upper layer can be used or not based on detailed availability configuration; or UE may report to upper layer the detailed availability configuration; or UE upper layer indicates which interfaces are allowed and AS layer performs the ultimate selection.

NW can derive and indicate if an interface is available but only with degraded performance for certain services. This solution focuses on the services that can tolerate certain degree of performance degradation. In this case, either the UE can decide to stick to that interface and prepare (e.g., adjust the application) for the degraded communication performance, or the UE may decide to switch to another interface.

The configurations can be exchanged among neighboring cells. In this way, the UEs can be prepared before moving to a target cell from the source cell, e.g., to proactively switch to another interface before entering the target cell where the current applied interface is congested.

Figure 2:
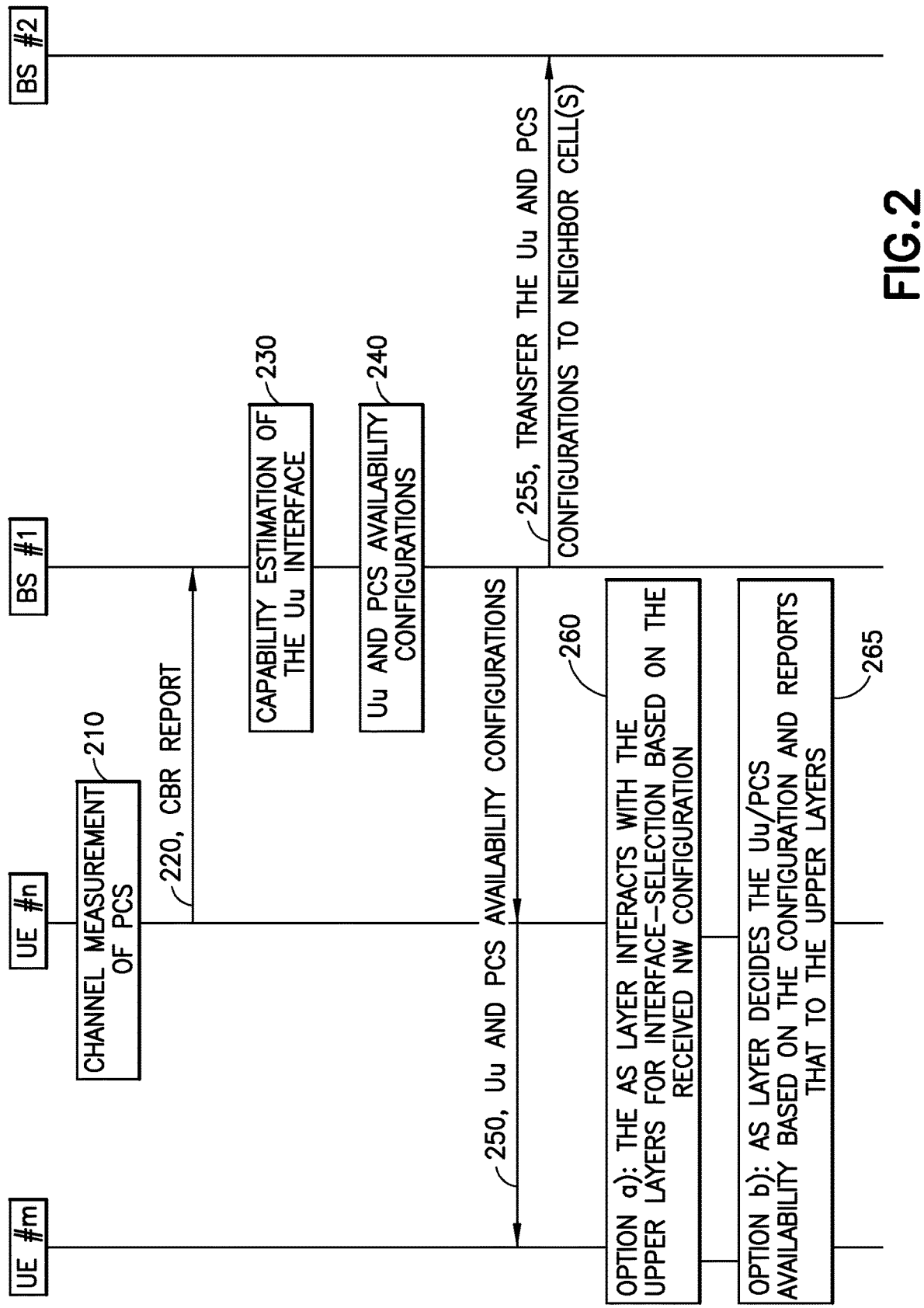
FIG. 2 illustrates a flow chart of operations for network-configured interface/mode availability in accordance with example embodiments of the invention.

FIG. 2 illustrates a flow chart of operations for network-configured interface/mode availability in accordance with one proposed solution in accordance with example embodiments of the invention;

It is noted that in FIG. 2 certain inventive steps in accordance with example embodiments of the invention are shown in at least steps 240 and 250 as identified in FIG. 2. Operations as shown in FIG. 2 are described below including additional details. These operations include:

1) The UEs UE #m and UE #n served by BS #1 are configured by the network to measure the CBR of the PC5 interface;
2) As shown in step 210 of FIG. 2 the UEs are configured by the network to report their measured CBRs using a CBR report 220, either periodically or aperiodically. For instance, the network can configure some events, which trigger the UE measurement report;
3) As shown in step 230 of FIG. 2 the BS #1 can estimate capability information of the Uu interface to determine the current capability of the network to support V2X services via the Uu interface, and as shown in step 240 of FIG. 2 estimate Uu and PC5 availability configurations, such as based on its real-time or predicated traffic load in the Uu and/or PC5 interface. Then as shown in step 250 of FIG. 2 the BS #1 can send the Uu and PC5 availability configurations towards the UE #m and UE #n, and as shown is step 255 of FIG. 2 the BS #1 can also share the estimated information by transferring the Uu and PC5 configurations to one or multiple neighbor cell(s), for example to a BS #2 of the neighbor cell. It is noted that in accordance with example embodiments of the invention at least the step 250 and the step 255 can occur or be performed simultaneously or in any arbitrary order.

With regards to step 240 above, based on the collected CBRs of PC5 and the estimated available Uu capacity, BS #1 can decide:

a) If there is or there will be heavy traffic load via the Uu interface, BS #1 configures the condition(s) for a V2X UE to select the Uu interface for V2X services:

a1) BS #1 can configure the requirements for selecting the Uu interface for a service w.r.t. the QoS attributes such as 5QI, QFI, priority level, delay budget, packet error rate, etc. In this sense, only the V2X services or the V2X data flows fulfilling the conditions set by network can select the Uu interface; and/or a2) BS #1 can configure the conditions by taking account of the CBR of the SL resource pools. In this approach, BS #1 can configure different requirements for different CBR levels. Therefore, network configures multiple CBR intervals or ranges, and each CBR interval or range (i.e., [$CBR_{low}, CBR_{high}$]) can map to a specific requirement for using the Uu interface. Again, the requirement here can be related with 5QI, QFI, the priority level, etc. For example, if a UE senses a high CBR over the SL resource pools, the 5QI/priority boundary can be relaxed so that more services can select the Uu interface. However, if a UE senses a low CBR over the SL resource pools, the 5QI/priority boundary should be restricted. Thus, less services can be transmitted via the Uu interface and the transmissions of the other services rely on the SL transmission via PC5. This approach ensures that the Uu interface can be used by the high priority services when there is not enough resource.

4) Then as shown in step 260 and step 265 of FIG. 2 the UEs can, based on the received configuration information, optimize its selection of the transmission interface/mode with two options:

Option a 160) In this option, the AS layer interacts with the upper layers for interface-selection based on the received network (NW) configuration; or Option b 165) AS layer decides the Uu/PC5 availability based on the configuration and reports that to upper layers.

Thus, network preserves the ability to control and differentiate the different QoS flows for using the Uu interface, based on the network traffic load.

Moreover, it has also the ability to take account of the CBR of the SL resource pools. Thus, if UE #1 experiences a higher SL CBR compared to UE #2, then UE #1 is more relaxed for using the Uu interface than UE 2, and it can utilize Uu for transmitting more services.

In accordance with example embodiments of the invention as described above, if there is or there will be heavy traffic load via the SL mode 1, BS #1 configures the condition(s) for a UE to use SL mode 1:

1) Same as the configuration for Uu, BS #1 can configure the requirements for a service to use SL mode 1. In this case, only services or data flows meeting the requirements can select SL mode 1. The requirements can be w.r.t. 5QI, QFI, priority level, delay budget, packet error rate, etc.;

2) Again, BS #1 has the ability to configure different requirements for different CBR intervals. In this context, the CBR can be:

A. the CBR measured from the resource pools of SL mode 1. For instance, in case of the UE experiences a relatively low CBR over the resource pools of SL mode 1, it can be configured with a more relaxed requirements w.r.t. PQI, PFI, priority level, delay budget, packet error rate etc. to select SL mode 1. Thus, due to a low CBR measured by UE #1 locally, more services can select SL mode 1. In this case, though BS #1 experiences/predicts a heavy traffic load for SL mode 1 under its whole coverage, the traffic load inside a specific area that is smaller than the whole coverage can be different from that in another specific area. Thus, the UEs in different areas can be configured with different settings that fit their individual situations;

B. the CBR measured from the resource pools of SL mode 2. In case of a low CBR over the resource pools of SL mode 2, BS #1 configures a more strict requirements w.r.t. PQI, PFI, priority level, delay budget, packet error rate etc. for a UE to select SL mode 1. Thus, only the services with strict requirements can be transmitted via SL mode 1, while the other services are forced to transmit via SL mode 2. Due to the low CBR over the SL mode 2 resource pools, these services with less strict requirements can be supported via SL mode 2. In this way, network can reduce the traffic load in the resource pools of SL mode 1. As a compromise, more services will select SL mode 2. In the other case where a high CBR is sensed for SL mode 2, there will be a low capacity available for SL mode 2. Thus, BS #1 configures a relaxed requirement for the UE to use SL mode 1. Instead of using the congested SL mode 2 resources, this allows more services to be transmitted via SL mode 1; and C. the CBR measured from all the resource pools, including resource pools of both SL mode 1 and mode 2. For example, in case the resource pools of SL mode 1 and SL mode 2 are overlapped together or the UE is lack of the necessary knowledge to differentiate the resource pools of SL mode 1 from those of SL mode 2, UE cannot measure the CBRs for each individual SL mode. In this case, UE measures the CBR for all the resource pools, and the network configures different requirements for the UE to select SL for different CBR intervals. For instance, a strict requirement is configured for the UE to select SL, in case of a high CBR level. Thus, if a UE senses a highly congested SL channel, the UE will select the Uu interface for the services with low priorities or vice versa that Uu interface is selected for V2X services with high priority level.

Please note that, since one SL mode can be configured with multiple resource pools, the above-mentioned CBR can refer to the measurement of either multiple resource pools or a single resource pool. As an example, a UE can measure the CBR of each resource pool, and network configures it to use the highest/lowest one from all the measured CBRs for mapping to the QoS requirement. Alternatively, a rule or condition can be configured or preconfigured to the UE for deriving the above-mentioned CBR value by using the CBRs measured from multiple resource pools.

Moreover, as mentioned herein, the interface availability information can be configured together with a valid time. The valid time can be either for a short term at the level of milliseconds/seconds, or for a long term at the level of minutes. In this sense, UE can use this information to expect the modified SIB or the update of the dedicated signaling. This can also be exploited by UE to determine whether the detailed Uu availability information should be provided to the upper layers or not. For instance, if the configuration information is valid for only a short term, UE may decide not to report the detailed availability information to the upper layers, in order to avoid an extensive interface availability information exchange between the AS layer and the upper layers.

Additionally, in another implementation, the configuration for Uu and PC5 can contain the activation time and the deactivation time. The setting of activation/deactivation timers is especially meaningful, if network has the ability to predict the traffic load change for future.

If a V2X UE is in RRC connected state, it can share more information with its serving cell. Thus, BS #1 can configure a specific requirement for only that V2X UE, based on the UE-specific information. And BS #1 can set the requirements by taking account of more attributes, such as logical channels and logical channel groups. As such, continuing with step 250 of FIG. 2 in the list as above there is in accordance with example embodiments of the invention:

1) BS #1 sends the derived configuration, e.g., as derived from Step 240 of FIG. 2 as in the list above, to the serving UEs, either in a broadcast manner or in a dedicated manner. In the broadcast case, system information block can be used. While in the dedicate manner, the downlink control information and/or RRC signaling can be exploited. In this sense, as mentioned before, BS #1 can set different configuration requirements for different UEs, based on the received measurement and context information of a specific UE. As one example, some UEs (e.g., ambulances or fire brigade trucks) might have higher priorities than other UEs, and they might get different configurations compared with the other UEs; and 2) BS #1 also sends the configuration to its neighboring cells for assisting their behaviors. For instance, a neighbor cell can adjust its own configuration taking account of the configuration information from BS #1, e.g., if there will be a large number of UEs moving from BS #1 to the neighbor cell. In addition, the information can also be sent to a UE by the neighboring cell if that UE is handed over to BS #1 during a handover procedure; and 3) Based on the received configuration information, UE can optimize its selection of the transmission interface/mode with two options:
   a) In this option, the AS layer keeps the detailed interface availability information received from BS #1. In this way, the AS layer does not report the detailed interface availability information to the upper layers, and it interacts with its upper layers for interface-selection. For example, if a packet is selected by upper layers for transmission via Uu but it has a 5QI that does not meet the configured requirement for using Uu, the AS layer can send a rejection message to the upper layers, which triggers the upper layers to reselect PC5; and
   b) In this option, the AS layer at the UE reports the detailed interface availability information to its upper layers, based on the network configuration. Thus, the upper layers can select the proper interface/mode for each service or each data flow.

Please note that here in this Step 3 above, the UE does not need to immediately switch/reselect the interface/mode, once it receives the configuration information. For example, UE might already have a set of periodical resources from the semi-persistent-scheduling for SL mode 1, and it can still use those resources and stay in SL mode 1 for that service. In another option, the network may configure the deadline for a UE to follow the configuration. Before that deadline, it is up to UE-implementation to select the timing for executing the received configuration.

Please note there could be another alternative approach for network to indicate the interface availability. In this alternative, network can utilize a bitmap for the availability information indication of each interface w.r.t. the different QoS profiles. In this bitmap, the interface availability information for each configured/preconfigured QoS profile should be shown. If this information is broadcasted to all UEs, the bitmap should cover all the configured/preconfigured QoS profiles that the serving network may provide for serving V2X services for all UEs. If the bitmap is dedicated to a specific UE or a group of UEs, the bitmap can cover those relevant QoS profiles. In addition, to derive that bitmap, network can have different considerations. For instance, network can predict/estimate the QoS profiles that can be supported via the considered interface, and it indicates that interface as available for these QoS profiles. For the QoS profiles whose QoS requirements cannot be guaranteed, network may indicate the interface as not available or available but with degraded performance. In another way, network can also force some QoS profiles to use interface B, by indicating the other interface A is not available for those QoS profiles.

In accordance with an example embodiment of the invention, once a V2X UE receives the bitmap for a specific interface, it can check the availability information for each of its configured QoS profiles, in order to make a proper decision for interface/mode selection. Moreover, for each QoS profile, the bitmap can contain the following availability information:
1. Interface is available to support the QoS requirements;
2. Interface is available but with degraded performance; and
3. Interface is not available.

Further, please note that in accordance with example embodiments of the invention the network can indicate status 1 and status 3 (i.e., the interface is either available or unavailable) by using one bit, without using status 2. In comparison, if network wants to indicate all the status (i.e., status 1, 2, and 3), two bits will be required for each QoS profile. In addition, some QoS profiles may use one bit to indicate the availability, while the other QoS profiles may use two bits, depending on the strictness of the QoS requirements. In other words, some QoS profiles may tolerate some performance degradation while the other QoS profiles not. Thus, it is no meaning to indicate status 2 to the QoS profiles that do not tolerate a performance degradation.

FIG. 3A illustrates operations which may be performed by a device such as, but not limited to, a device associated with the RAN node 170 as in FIG. 1. As shown in step 310 of FIG. 3A there is identifying, by a network node (e.g., a base station) of a communication network, a configuration of interface availability for performing at least one of v2x service and/or proximity services by each of at least one network device (e.g., one or more user equipment). Then as shown in step 320 of FIG. 3A there is communicating with the at least one network device information comprising the configuration based on the interface availability for use in performing the at least one of v2x service and/or proximity services.

In accordance with example embodiments of the invention as described in the paragraph above, wherein the interface availability comprises an availability of at least one of a Uu interface and/or a PC5 interface for performing the at least one of v2x service and/or proximity services by the at least one network device.

In accordance with example embodiments of the invention as described in the paragraphs above, wherein the configuration comprises at least one of a default availability information in the network device based on at least one of an in-coverage or an out-of-coverage condition applied to at least one of v2x service and/or proximity service, and/or a detailed interface availability information applied to at least one of v2x service and/or proximity service.

In accordance with example embodiments of the invention as described in the paragraphs above, wherein the interface availability configuration comprises at least one of: indication of the availability of one or more interface for different quality of service (QoS) profiles and/or rules for conditions that the network device uses to determine for the availability of different interfaces for different QoS profiles and/or usage of at least one of the default and/or detailed interface availability information In accordance with example embodiments of the invention as described in the paragraphs above, wherein the configuration is communicated in a system information block via broadcast signaling, and/or wherein the configuration is communicated in at least one of downlink control information and/or radio resource control signaling via dedicated signaling.

In accordance with example embodiments of the invention as described in the paragraphs above, wherein the configuration comprises at least one of: indication of the availability of one or more interface for different quality of service (QoS) profiles and/or rules for conditions that the network device uses to determine for the availability of different interfaces for different QoS profiles, or the usage of the determined availability information in the network device.

In accordance with example embodiments of the invention as described in the paragraphs above, wherein the rules or conditions may comprise the association of Uu and PC5 interface availability and at least one of: QoS profiles of the at least one of v2x service or proximity service; logical channels of the at least one of v2x service and/or proximity service; logical channel groups of the at least one of v2x service and/or proximity service, threshold of the Uu interface quality, threshold of the PC5 interface quality, and/or a valid time of the determined Uu and/or PC5 interface availability.

In accordance with example embodiments of the invention as described in the paragraphs above, wherein the QoS profiles are differentiated based on at least one of 5G quality of service indicator, PC5 quality of service indicator, a quality of the service flow, and/or PC5 flow indicator.

In accordance with example embodiments of the invention as described in the paragraphs above, wherein based on a determined condition that an interface is experiencing degraded performance, the rules for conditions comprises a rule to use the interface with degraded performance only for performing the at least one of v2x service and/or proximity services with quality of service requirements that can tolerate the degraded performance.

In accordance with example embodiments of the invention as described in the paragraphs above, wherein the communicating comprises communicating the information comprising the configuration with at least one neighbor cell for use to adjust a configuration at the at least one neighbor cell.

In accordance with example embodiments of the invention as described in the paragraphs above, wherein the configuration is communicated in a system information block via broadcast signaling, and/or wherein the configuration is communicated in at least one of downlink control information and/or radio resource control signaling via dedicated signaling.

In accordance with example embodiments of the invention as described in the paragraphs above, wherein the communicating comprises communicating the information comprising the configuration with at least one neighbor cell for use to adjust a configuration for the network device to roam between a serving cell and a neighbor cell of the at least one neighbor cell based on the information.

In accordance with example embodiments of the invention as described in the paragraphs above, wherein the condition of the Uu and/or PC5 interface availability is taking into account at least one of a channel busy ratio of at least one sidelink pool for performing the at least one of v2x service and/or proximity services and/or a weight of a traffic load via the Uu and/or the PC5 interface.

In accordance with example embodiments of the invention as described in the paragraphs above, wherein a range of the channel busy ratio of each sidelink resource pool is mapped in the configuration to a specific requirement for usage of the at least one of the Uu interface and/or the PC5 interface for the at least one of v2x service and/or proximity services.

In accordance with example embodiments of the invention as described in the paragraphs above, wherein the configuration comprises a time threshold for which the configuration is valid.

In accordance with example embodiments of the invention as described in the paragraphs above, wherein the information comprising the configuration is using a bitmap.

A non-transitory computer-readable medium (e.g., Memory(ies) 155 as in FIG. 1) storing program code (e.g., Computer program Code 153 and/or Sidelink Module 150-2 as in FIG. 1), the program code executed by at least one processor (Processor(s) 152 and/or Sidelink Module 150-1 as in FIG. 1) to perform the operations as at least described in the paragraphs above.

In accordance with an example embodiment of the invention as described above there is an apparatus comprising: means for identifying (RRH 195, Memory(ies) 155, Computer program Code 153 and/or Sidelink Module 150-2; and Processor(s) 152 and/or Sidelink Module 150-1 as in FIG. 1), by a network node (e.g., RAN Node 170 as in FIG. 1) of a communication network (e.g., wireless network 100 as in FIG. 1), a configuration of interface availability for performing at least one of v2x service and/or proximity services by each of at least one network device (e.g., UE 110 as in FIG. 1); and means for communicating (RRH 195, Memory(ies) 155, Computer program Code 153 and/or Sidelink Module 150-2; and Processor(s) 152 and/or Sidelink Module 150-1 as in FIG. 1) with the at least one network device information comprising the configuration based on the interface availability for use in performing the at least one of v2x service and/or proximity services FIG. 3B illustrates operations which may be performed by a device such as, but not limited to, a device associated with the UE 110 as in FIG. 1. As shown in step 350 of FIG. 3B there is receiving, by a network device of a communication network, information comprising a configuration of interface availability for performing at least one of v2x service and/or proximity services by the network device. Then as shown in step 360 of FIG. 3B there is determining, based on the received configuration, the interface availability for performing the at least one of v2x service and/or proximity services.

In accordance with example embodiments of the invention as described in the paragraph above, wherein the interface availability comprises an availability of at least one of a Uu interface and/or a PC5 interface for performing the at least one of v2x service and/or proximity services by the at least one network device.

In accordance with example embodiments of the invention as described in the paragraphs above, wherein the configuration is received in a system information block via broadcast signaling, and/or wherein the configuration is received in at least one of downlink control information and/or radio resource control signaling via dedicated signaling.

In accordance with example embodiments of the invention as described in the paragraphs above, wherein the configuration comprises at least one of: indication of the availability of one or more interface for different quality of service (QoS) profiles, rules for conditions that the network device uses to determine for the availability of different interfaces for different QoS profiles, and/or the usage of the determined availability information in the network device.

In accordance with example embodiments of the invention as described in the paragraphs above, wherein the rules and/or conditions comprise the association of Uu and PC5 interface availability and at least one of: QoS profiles of the at least one of v2x service and/or proximity service; logical channels of the at least one of v2x service and/or proximity service; logical channel groups of the at least one of v2x service and/or proximity service, threshold of the Uu interface quality, threshold of the PC5 interface quality, and/or a valid time of the determined Uu and/or PC5 interface availability In accordance with example embodiments of the invention as described in the paragraphs above, wherein the QoS profiles are differentiated based on at least one of 5G quality of service indicator, PC5 quality of service indicator, a quality of the service flow, and/or PC5 flow indicator.

In accordance with example embodiments of the invention as described in the paragraphs above, wherein based on a determined condition that an interface is experiencing degraded performance, the rules for conditions comprises a rule to use the interface with degraded performance only for performing the at least one of v2x service and/or proximity services with quality of service requirements that can tolerate the degraded performance.

In accordance with example embodiments of the invention as described in the paragraphs above, wherein the communicating comprises communicating the information comprising the configuration with at least one neighbor cell for use to adjust a configuration at the neighbor cell and/or adjust a configuration for the network device to roam between a serving cell and a neighbor cell based on the information.

In accordance with example embodiments of the invention as described in the paragraphs above, wherein the condition of the Uu and/or PC5 interface availability is taking into account at least one of a channel busy ratio of at least one sidelink pool for performing the at least one of v2x service and/or proximity services or a weight of a traffic load via the Uu and/or the PC5 interface.

In accordance with example embodiments of the invention as described in the paragraphs above, wherein a range of the channel busy ratio of each sidelink resource pool is mapped in the configuration to a specific requirement for usage of the at least one of the Uu interface and/or the PC5 interface for the at least one of v2x service and/or proximity services.

In accordance with example embodiments of the invention as described in the paragraphs above, wherein the configuration comprises a time threshold for which the configuration is valid.

In accordance with example embodiments of the invention as described in the paragraphs above, wherein the information comprising the configuration is using a bitmap.

A non-transitory computer-readable medium (e.g., Memory(ies) 125 as in FIG. 1) storing program code (e.g., Computer program Code 123 and/or Sidelink Module 140-2 as in FIG. 1), the program code executed by at least one processor (Processor(s) 120 and/or Sidelink Module 140-1 as in FIG. 1) to perform the operations as at least described in the paragraphs above.

In accordance with an example embodiment of the invention as described above there is an apparatus comprising: means for receiving (e.g., one or more transceivers 130, Memory(ies) 125, Computer program Code 123 and/or Sidelink Module 140-2; and Processor(s) 120 and/or Sidelink Module 140-1 as in FIG. 1), by a network device (e.g., UE 110 as in FIG. 1) of a communication network (e.g., wireless network 100 as in FIG. 1), information comprising a configuration of interface availability for performing at least one of v2x service and/or proximity services by the network device; and means for determining (e.g., one or more transceivers 130, Memory(ies) 125, Computer program Code 123 and/or Sidelink Module 140-2; and Processor(s) 120 and/or Sidelink Module 140-1 as in FIG. 1), based on the received configuration, the interface availability for performing the at least one of v2x service and/or proximity services.

Based on the above, the main advantages of the example embodiments of the invention include at least:

Network has the ability to configure the proper services/data flows for using an interface/mode experiencing a high traffic load. Thus, the possibility to be rejected by the network can be controlled, and the additional signaling messages and latency as mentioned herein can be reduced; and Network is able to configure different requirements for different UEs, based on their channel sensing results. Thus, since the UEs at different locations may experience different CBRs, this proposal enables a local optimization for interface/mode selection, which can achieve a better resource efficiency.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
   at least one processor; and
   at least one memory including computer program code, where the at least one memory and the computer program code are configured, with the at least one processor, to cause the apparatus to at least:
   identify, by the apparatus of a communication network, a configuration of interface availability for performing vehicle-to-everything (v2x) service and proximity services by each of at least one network device, wherein the interface availability includes an availability of a Uu interface and a PC5 interface for performing the v2x service and the proximity services by the at least one network device, and
   wherein the configuration of interface availability is taking into account a channel busy ratio of at least one sidelink pool for performing the v2x service and proximity services, and a weight of a traffic load via the Uu and the PC5 interface; and
   communicate with the at least one network device information including the configuration based on the interface availability for use in performing the v2x service and proximity services,
   wherein the communicating comprises communicating the information comprising the configuration with at least one neighbor cell for use to adjust a configuration at the at least one neighbor cell and/or to adjust a configuration for the network device to roam between a serving cell and a neighbor cell of the at least one neighbor cell based on the information,
   wherein the configuration includes a default availability information in the network device based on an in-coverage or an out-of-coverage condition applied to v2x service and proximity service, and a detailed interface availability information applied to the v2x service and the proximity service, and
   wherein the interface availability configuration comprises rules for conditions that the network device uses to determine the availability of different interfaces for different QoS profiles wherein the rules for conditions comprise an association of Uu and PC5 interface availability and:
   QoS profiles of the v2x service and proximity service,
   logical channels of the v2x service and the proximity service,
   logical channel groups of the v2x service and the proximity service,
   threshold of a Uu interface quality;
   threshold of a PC5 interface quality, and
   a valid time of the determined Uu and PC5 interface availability,
   wherein the QoS profiles are differentiated based on 5G quality of service indicator, PC5 quality of service indicator, a quality of the service flow, and PC5 flow indicator.

* * * * *